(12) United States Patent
Noirot-Nerin

(10) Patent No.: US 7,353,510 B2
(45) Date of Patent: Apr. 1, 2008

(54) SYSTEM AND METHOD FOR COMPARING OBJECTS

(75) Inventor: Francois Noirot-Nerin, Saint-Cloud (FR)

(73) Assignee: Computer Associates Think, Inc., Islandia, NY (US)

( * ) Notice: Subject to any disclaimer, the term of this patent is extended or adjusted under 35 U.S.C. 154(b) by 635 days.

(21) Appl. No.: 10/733,747

(22) Filed: Dec. 11, 2003

(65) Prior Publication Data

US 2005/0010905 A1    Jan. 13, 2005

Related U.S. Application Data

(60) Provisional application No. 60/486,727, filed on Jul. 11, 2003.

(51) Int. Cl.
*G06F 9/445* (2006.01)

(52) U.S. Cl. .................. 717/175; 717/169; 717/170

(58) Field of Classification Search ............. None
See application file for complete search history.

(56) References Cited

U.S. PATENT DOCUMENTS

| 6,591,377 | B1 * | 7/2003 | Evoy ....................... 714/37 |
| 6,789,252 | B1 * | 9/2004 | Burke et al. ............. 717/100 |
| 6,941,323 | B1 * | 9/2005 | Galperin ................ 707/104.1 |

* cited by examiner

*Primary Examiner*—Tuan Dam
*Assistant Examiner*—Chuck Kendall
(74) *Attorney, Agent, or Firm*—Pillsbury Winthrop Shaw Pittman, LLP

(57) ABSTRACT

A method for comparing objects includes selecting a first object and a second object, each object associated with an instance of at least one primary parameter and an instance of at least one secondary parameter, each secondary parameter associated with one of the primary parameters. At least a portion of the first object and at least a portion of the second object are compared to identify one or more differences between the selected objects. At least a portion of the differences are identified as ignorable based, at least in part, on the one or more primary parameters.

31 Claims, 6 Drawing Sheets

SYSTEM AND METHOD FOR COMPARING OBJECTS

RELATED APPLICATION

This application claims the priority under 35 U.S.C. §119 of provisional application Ser. No. 60/486,727 filed Jul. 11, 2003.

TECHNICAL FIELD

The present disclosure relates generally to the field of data processing and, more specifically, to a system and method for comparing objects.

BACKGROUND

Computing systems and associated software applications normally include a number of objects, such as files, registry entries, a group of parameters, and/or groups of variables, which are used to define and maintain the system. Occasionally, these objects are customized for the individual system, user, or local installation. Example objects that may be different between similar installations include local host name, user name, primary installation path, tree structure, and many others. Often, these customizable parameters and variables are used by the local installation to affect other local parameters and variables.

SUMMARY

This disclosure provides a system and method for comparing objects. In one embodiment, a method for comparing objects includes selecting a first object and a second object, each object associated with an instance of at least one primary parameter and an instance of at least one secondary parameter, each secondary parameter associated with one of the primary parameters. At least a portion of the first object and at least a portion of the second object are compared to identify one or more differences between the selected objects. At least a portion of the differences are identified as ignorable based, at least in part, on the one or more primary parameters.

DETAILED DESCRIPTION OF EXAMPLE EMBODIMENTS

Figure 1:
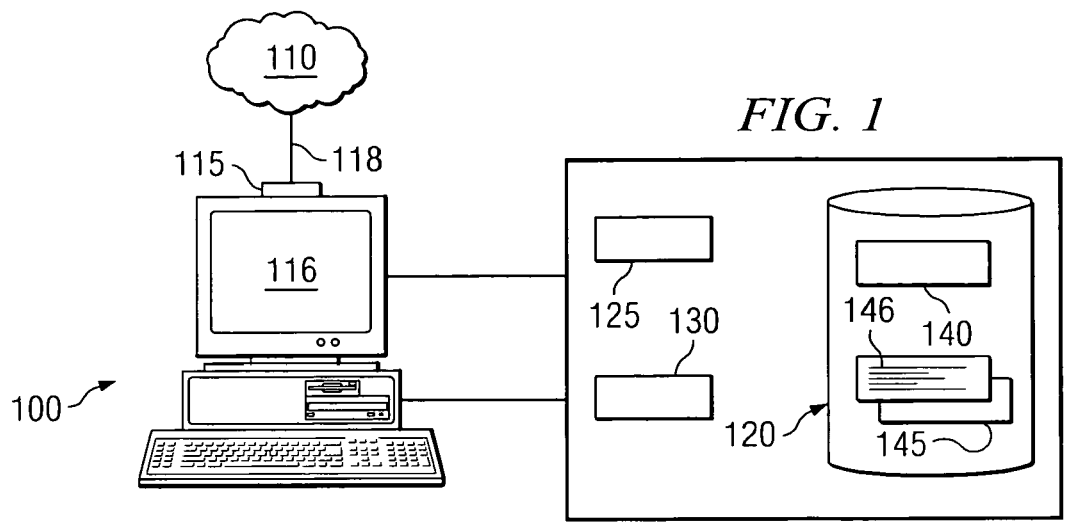
FIG. 1 is a block diagram illustrating a system for comparing objects according to one embodiment of the present disclosure.

FIG. 1 is a block diagram illustrating a computer system 100 for comparing objects according to one embodiment of the present disclosure. In general, the present disclosure contemplates any system 100 that processes differences between objects in different instances of similar software configurations or installations to automatically determine, report, or process logical differences and similarities using a comparison engine 130. Accordingly, computer 100 may comprise a portion of an information management system operable to compare parameters of two configurations and automatically ignore differences between similar parameters using comparison engine 130. Generally, ignorable means that the parameters are substantially similar—i.e., the difference between the parameters is minimal—and may be processed differently from other differences. For example, differences may include data differences, identification differences, address differences, or any other physical or logical difference. In one embodiment, system 100 may include a Database Management System (DBMS). In this embodiment, comparison engine 130 may compare configuration objects, such as schemas and authorized users, between two networked installations of the DBMS. The term "automatically," as used herein, generally means that the appropriate processing is substantially performed by at least part of comparison engine 130. It should be understood that "automatically" further contemplates any suitable user interaction with system 100 without departing from the scope of this disclosure. The term "dynamically," as used herein, generally means that certain processing is determined, at least in part, at run-time based on one or more variables.

Computer system 100 includes graphical user interface 116, memory 120, processor 125, and an input device such as a keyboard, mouse or touch screen. The illustrated system 100 also includes comparison engine 130, software applications 140, and objects 145 that may be stored in memory 120 and executed or processed by processor 125. At a high level, as used in this document the term "computer" is intended to encompass a personal computer, workstation, server network computer, mainframe or any other suitable processing device. Computer system 100 may execute any operating system including UNIX, Windows, Linux, and others. FIG. 1 only provides one example of a computer that may be used with the disclosure. The present disclosure contemplates computers other than general purpose computers as well as computers without conventional operating systems.

Computer 100 may include an interface 115 for communicating with other computer systems over network 110 such as, for example, in a client-server or other distributed environment via link 118. In certain embodiments, computer 100 receives configuration files or objects 145 from network 110 for storage in memory 120. Network 110 facilitates wireless or wireline communication between computer system 100 and any other computer. Network 110 may communicate, for example, Internet Protocol (IP) packets, Frame Relay frames, Asynchronous Transfer Mode (ATM) cells, voice, video, data, and other suitable information between network addresses. Network 110 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 115 comprises logic encoded in software and/or hardware in a suitable combination and operable to communicate with network 110 via link 118. More specifically, interface 115 may comprise software supporting one or more communications protocols associated with link 118 and communications network 110 hardware operable to communicate physical signals.

Computer 100 may further include graphical user interface (GUI) 116 that is operable to provide a front-end for comparison engine 130. GUI 116 comprises a graphical user interface operable to allow the user of computer 100 to interact with comparison engine 130. Generally, GUI 116 provides the user of computer 100 with an efficient and user-friendly presentation of data provided by computer 100 or network 110. GUI 116 may comprise a plurality of displays having interactive fields, pull-down lists, and buttons operated by the user. In one example, GUI 116 presents an explorer-type interface and receives commands from the user. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in computer 100 and efficiently presents the information to the user. Network 110 can accept data from the user of computer 100 via the web browser (e.g., Microsoft Internet Explorer or Netscape Navigator) and return the appropriate HTML, Java, or eXtensible Markup Language (XML) responses.

Memory 120 may include any memory, hard drive, or database module and may take the form of volatile or non-volatile memory including, without limitation, magnetic media, optical media, random access memory (RAM), read-only memory (ROM), removable media, or any other suitable local or remote memory component. In the illustrated embodiment, memory 120 includes software applications 140 and objects 145. Memory 120 may include any other data without departing from the scope of this disclosure.

Each software application 140 comprises any software or logic operable to be executed by any computing device and includes at least one object 145 operable to be compared by comparison engine 130. For example, application 140 may comprise a relational database, a security system, or any other executable file or module. In another example, software application 140 comprises an instance of an operating system operable to be processed by comparison engine 130. Moreover, multiple physical instances or installations of one software application 140 may be each be referred to as a separate software application 140 without departing from the scope of this disclosure. Normally, each software application 140 is associated with one or more objects 145. Generally, each object 145 is a grouping of at least a portion of any data, called parameters 146, associated with software application 140. Moreover, each object 145 may comprise a grouping of child objects 145 without departing from the scope of this disclosure. In one embodiment, object 145 may comprise the configuration, schema, or installation data (each an example of child object 145 or parameter 146) for software application 140. In short, object 145 may comprise, either individually or in combination, any software module, file, library, registry, registry entry, or algorithm that comprises, references, or is associated with one or more parameters 146.

Parameter 146 comprises any variable, datum, or child object 145 that includes at least two portions or parts: a logical name or identifier and at least one attribute or value. The logical name or identifier may comprise any datum operable to, as appropriate, identify or distinguish parameter 146. Accordingly, name or identifier may be used interchangeably without departing from the scope of this disclosure. In one embodiment, parameter 146 may comprise an entry in a Windows ".ini" file, a Unix ".cfg" file, a registry key, or any other variable associated with one instance of software application 140. In another embodiment, parameter 146 may comprise a system or environment variable that may, when appropriate, be utilized by multiple software applications 140. Occasionally, a first parameter 146 may be referenced, either directly or indirectly, by a second parameter 146. For ease of illustration, the referenced (or first) parameter 146 may be termed a primary parameter, while the referencing (or second) parameter 146 may be termed a secondary parameter. It will be understood that references may be cumulative without departing from the scope of this disclosure; in other words, a secondary parameter 146 in one referencing relationship may be a primary parameter 146 in another. As an illustration, first parameter 146 may be referenced by second parameter 146, which in turn is referenced by third parameter 146. Moreover, secondary parameter 146 may reference more than one primary parameter 146 and primary parameter 146 may be referenced by more than one secondary parameter 146. In certain embodiments, the reference may comprise a link to the primary parameter 146 or may include the value of the primary parameter 146 in either the name or attribute portion. This reference is often termed an "embedded portion" of the secondary parameter 146. Accordingly, an instance of parameter 146 may be, singly or in combination, a "name part embedded portion matching instance" or an "attribute part embedded portion matching instance". Name part embedded portion matching instance may signify that at least part of the name portion of one instance of parameter 146 substantially matches that of one or more primary parameters 146. Similarly, attribute part embedded portion matching instance may signify that at least part of the attribute portion of one instance of parameter 146 substantially matches that of one or more primary parameters 146.

For example, environment parameters 146 in computer 100, such as the "PATH" or library path, typically include sub-strings that are various locations where specific instances of software application 140 are installed. In this example, two instances of software application 140 are installed at first primary parameter 146, C:\XYZ, on one machine and at second primary parameter 146, D:\ABCD, on another machine. Each instance may include a secondary parameter 146 specifying the location of executable files for the software instance. For example, the value of each instance of the secondary parameter 146 may be "C:\SYSTEM; C:\XYZ\bin" on the first machine and "C:\SYSTEM; D:\ABCD\bin" on the second. These paths may be considered as "logically" similar, given that they differ only on the physical location of software application 140 (the primary parameter 146), which is already known to be different. Continuing with the example, if instead the secondary parameter 146 on the second machine was "C:\SYSTEM; D:\ABCD\a", then even ignoring the logical similarity results in a difference, namely "bin" opposed to "a".

In another example, comparison engine 130 may compare the tree structure and associated files between two users of different instances of the same software application 140. Each example user is given a different user ID to uniquely identify the user, such as userid1 and userid2. In this example, each software instance includes at least one sub-tree structure that differ only through a substring identifying the user ID that is placed between fixed, specific strings: i.e., "C:\preferences\userid1\tools\" and "C:\preferences\userid2\tools\". If the difference in the intermediate substring is not ignored, then no comparison will be done on what is stored on the corresponding paths. But if system 100 is aware of the primary parameter difference, userid1 vs. userid2, and identifies this difference in the paths as differences to be ignored, then the full comparison can take place under those paths that differ through a rule depending on the "user ID" primary parameter 146.

Processor 125 executes instructions and manipulates data to perform the operations of computer 100, such as processing by comparison engine 130. Although FIG. 1 illustrates a single processor 125 in computer 100, multiple processors 125 may be used and reference to processor 125 is meant to include multiple processors 125 where applicable. In the embodiment illustrated, computer 100 includes comparison engine 130 that compares two or more objects 145 to identify differences and logical similarities between parameters 146 associated with each object 145. Comparison engine 130 could include any hardware, software, firmware, logic, or combination thereof operable to compare at least two objects 145. For example, comparison engine 130 may be written in any appropriate computer language including C, C++, Java, Visual Basic, and others. Further, it will be understood that while comparison engine 130 is illustrated as a single multi-tasked module, the features and functionality performed by this engine may be performed by multiple modules such as, for example, an identification module and a reporting module. Comparison engine 130 may use any appropriate technique to compare two or more objects 145 based on parameters 146.

In one aspect of operation, computer 100 selects a first object 145 and a second object 145. This selection may be in response to a directive or instruction by the user of computer 100 without departing from the scope of this disclosure. Comparison engine 130 processes each object 145 to select parameters 146 for comparison. For example, comparison engine 130 may process parameters 146 in order to determine whether certain parameters 146 are dependent, or secondary parameters 146, on one or more of the other parameters 146. In many cases, any parameter 146 that is not dependant on another parameter 146 is termed primary parameter. Comparison engine 130 then compares at least a subset of the instances of parameters 146 from each object 145 to identify differences such as secondary parameter names or secondary parameter values. Based on the identified dependencies to similar primary parameters, comparison engine 130 may determine that certain differences are to be ignored. Once these ignorable differences are identified, comparison engine 130 may then communicate the remainder of the differences to the user. In short, comparison engine 130 may ignore some or all of the differences that are determined to be ignorable such that the user is not required to view multiple instances or variations of similar differences.

In certain aspects of operation, when names or value portions of secondary parameters 146 include logical similarities and specific differences, the readability of any output may be affected by the presence of the differences to be ignored. Accordingly, it may be appropriate when displaying the differences for such instances to replace the portions to be ignored by a representation of the corresponding underlying primary parameter 146, rather than the actual values that may differ between the two objects 145. For example:

|  | Parameter name in first object | Parameter name in second object | Value in first object | Value in second object |
|---|---|---|---|---|
| First Primary | Pparam1 | | Pparam1val1 | Pparam1val2 |
| Second Primary | Pparam2 | | Pparam2val1 | Pparam2val2 |
| Potent. depend. | X_Pparam1val1 | X_Pparam1val2 | Pparam2val1_B | Pparam2val2_X |

Reporting the differences would correspond to the following table:

| Differences | | | |
|---|---|---|---|
| First object | | Second object | |
| Parameter name | Parameter value | Parameter name | Parameter value |
| X_Pparam1val1 | Pparam2val1_B | X_Pparam1val2 | Pparam2val2_X |

But if the logical similarities are replaced by a representation of the associated primary parameter 146, showing the differences would correspond to the new table:

| Differences | | |
|---|---|---|
| Parameter | First object | Second object |
| X_<Pparam1> | <Pparam2>_B | <Pparam2>_X |

Of course, <Pparam1> and <Pparam2> may be replaced by any suitable representation of the parameters such as, for example, an icon in GUI 116.

Figure 2A:
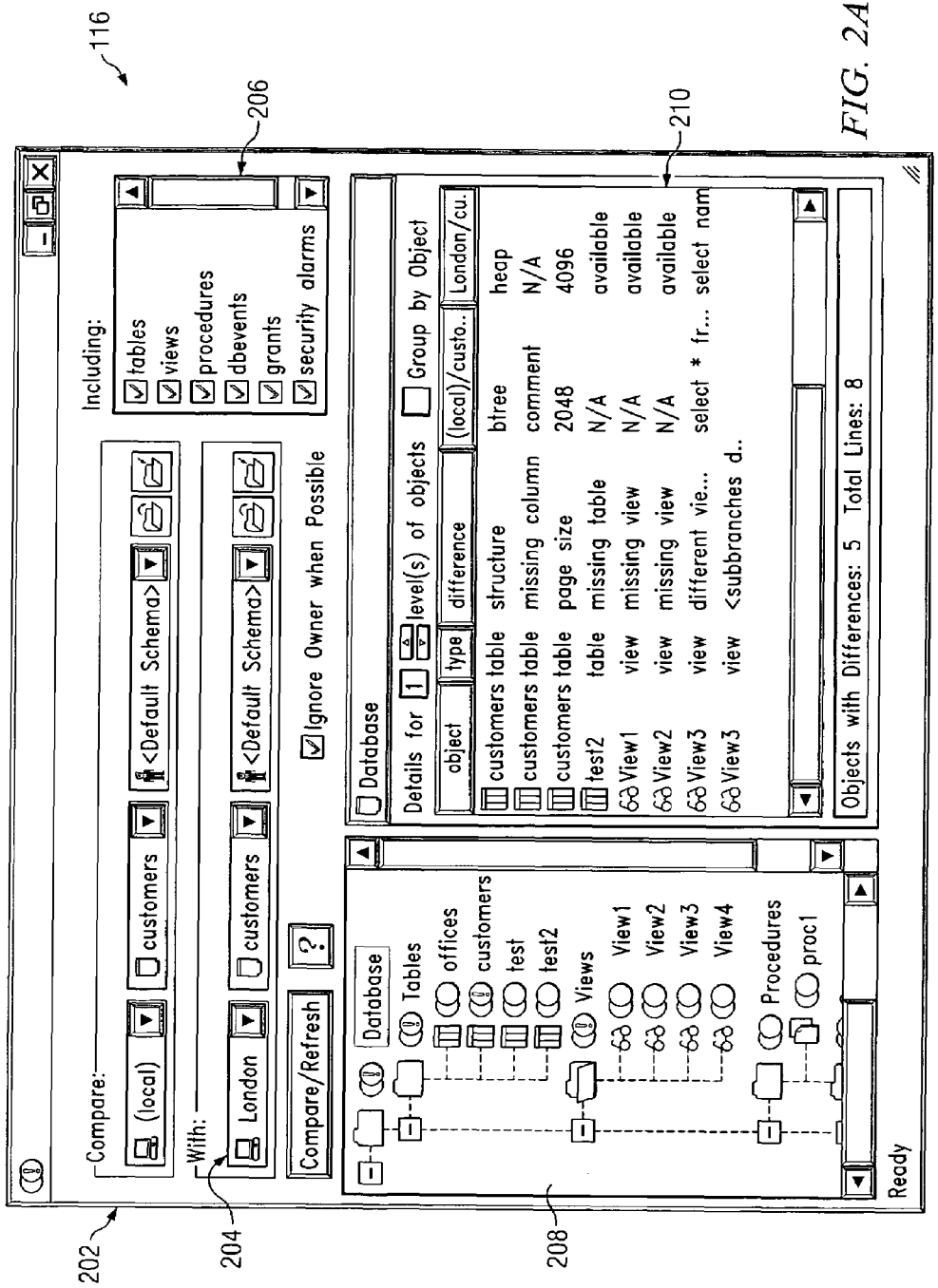
FIGS. 2A-B illustrate example graphical user interfaces presented by the system in FIG. 1.

FIG. 2A illustrates an example graphical user interface 116 presented by system 100. It will be understood that illustrated GUI 116 is for example purposes only and may be any in appropriate format, layout, or language. Moreover, illustrated GUI 116 may comprise a parent, child, solitary, or portion of the user interface presented to the user of computer 100 without departing from the scope of this disclosure. According to the illustrated embodiment, GUI 116 includes first object selection 202, second object selection 204, object type selection 206, summary tree 208, and detailed differences report 210. First object selection 202 and second object selection 204 allow the user, when desired, to manually select the first and second object 145 for comparison. The illustrated GUI 116 provides the user with various groups of objects 145 for different nodes on network 110. But any selection, including automatic or dynamic, of any number of objects 145 may be used as appropriate. Example object type selection 206 provides the user of computer 100 to restrict the automatic comparison to certain types of objects 145. Example summary tree 208 provides high-level descriptive information for the reported differences between the selected objects 145. Upon the user selecting one of the branches or leaves of tree 208, the differences report 210 is populated with details regarding the differences between the selected objects 145.

Figure 2B:
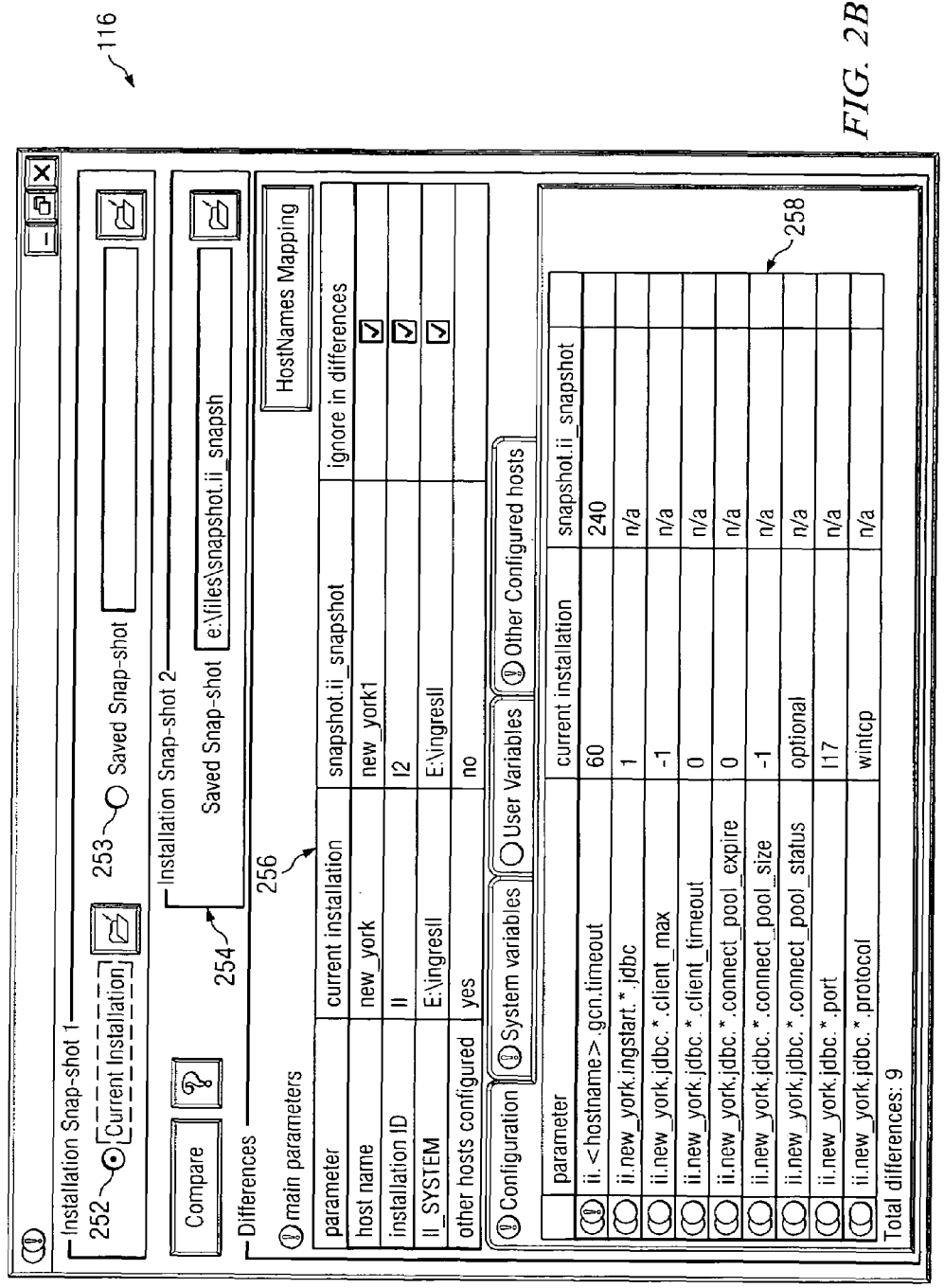

FIG. 2B illustrates an example graphical user interface 116 presented by system 100. It will be understood that illustrated GUI 116 is for example purposes only and may be any in appropriate format, layout, or language. Moreover, illustrated GUI 116 may comprise a parent, child, solitary, or portion of the user interface presented to the user of computer 100 without departing from the scope of this disclosure. According to the illustrated embodiment, GUI 116 includes first object selection 252, saved snapshot 253, second object selection 254, primary parameter listing 256, and differences report 258. First object selection 252 or saved snapshot 253 and second object selection 254 allow the user, when appropriate, to manually select the objects 145 for comparison. The illustrated GUI 116 provides the user with snapshots of various groups of objects 145 for different nodes on network 110 at 252, 253, and 254. But any selection, including automatic or dynamic, of any number of objects 145 may be used as appropriate. Example primary parameter listing 256 provides a listing of at least a portion of the primary parameters 146 included in selected objects 145. Example listing 256 further includes a check box operable to allow the user to determine whether or not to ignore differences in the associated primary parameter 146, when comparing dependent secondary parameters 146 in the comparison processing. Differences report 258 provides the user with at least a portion of secondary parameters 146 or other non-primary parameters that are different between the two selected objects 145.

Figure 3A:
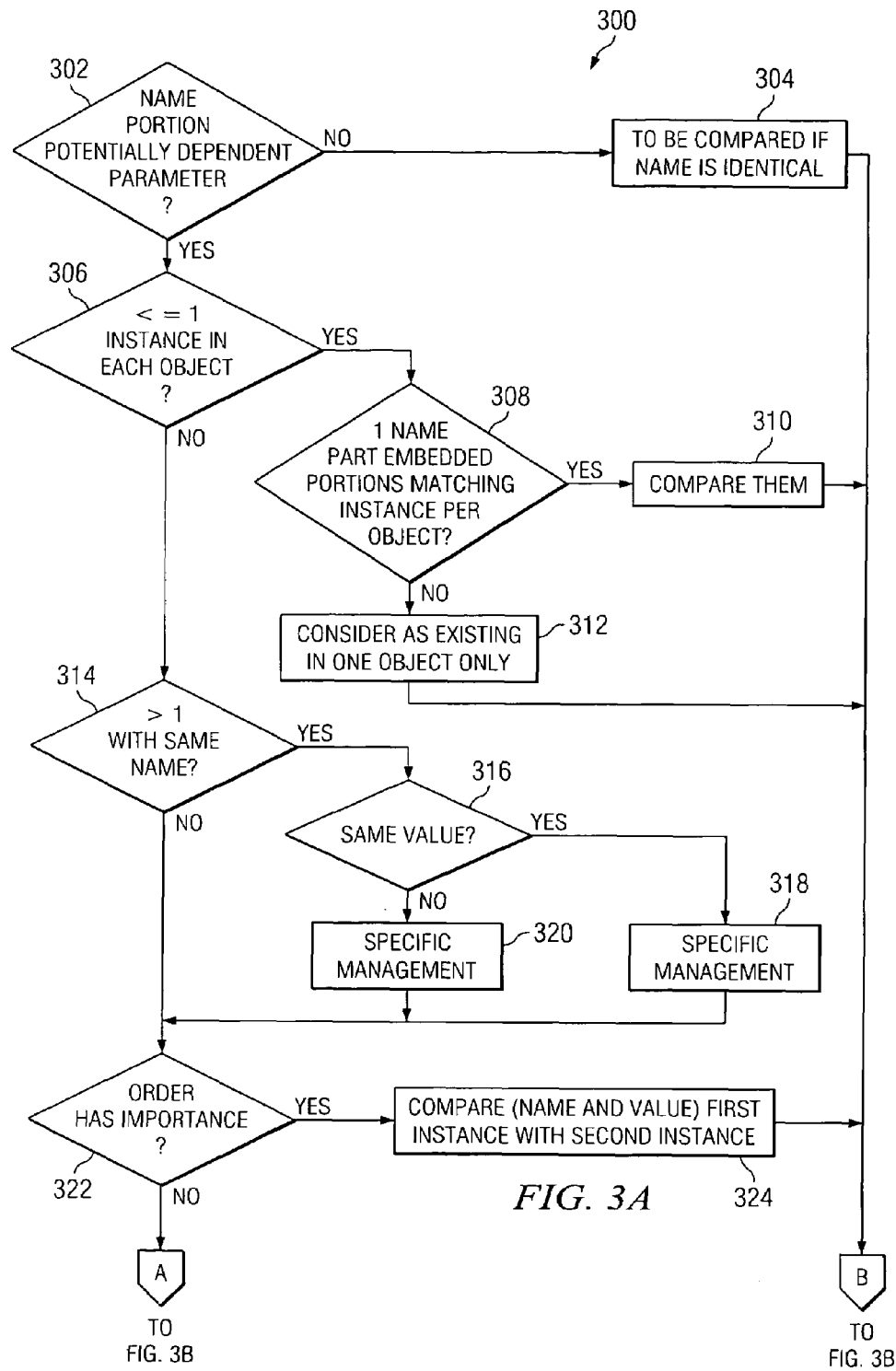
FIGS. 3A-B are flowcharts illustrating an example method for selecting which parameters in the objects to compare according to one embodiment of the present disclosure.
Figure 3B:
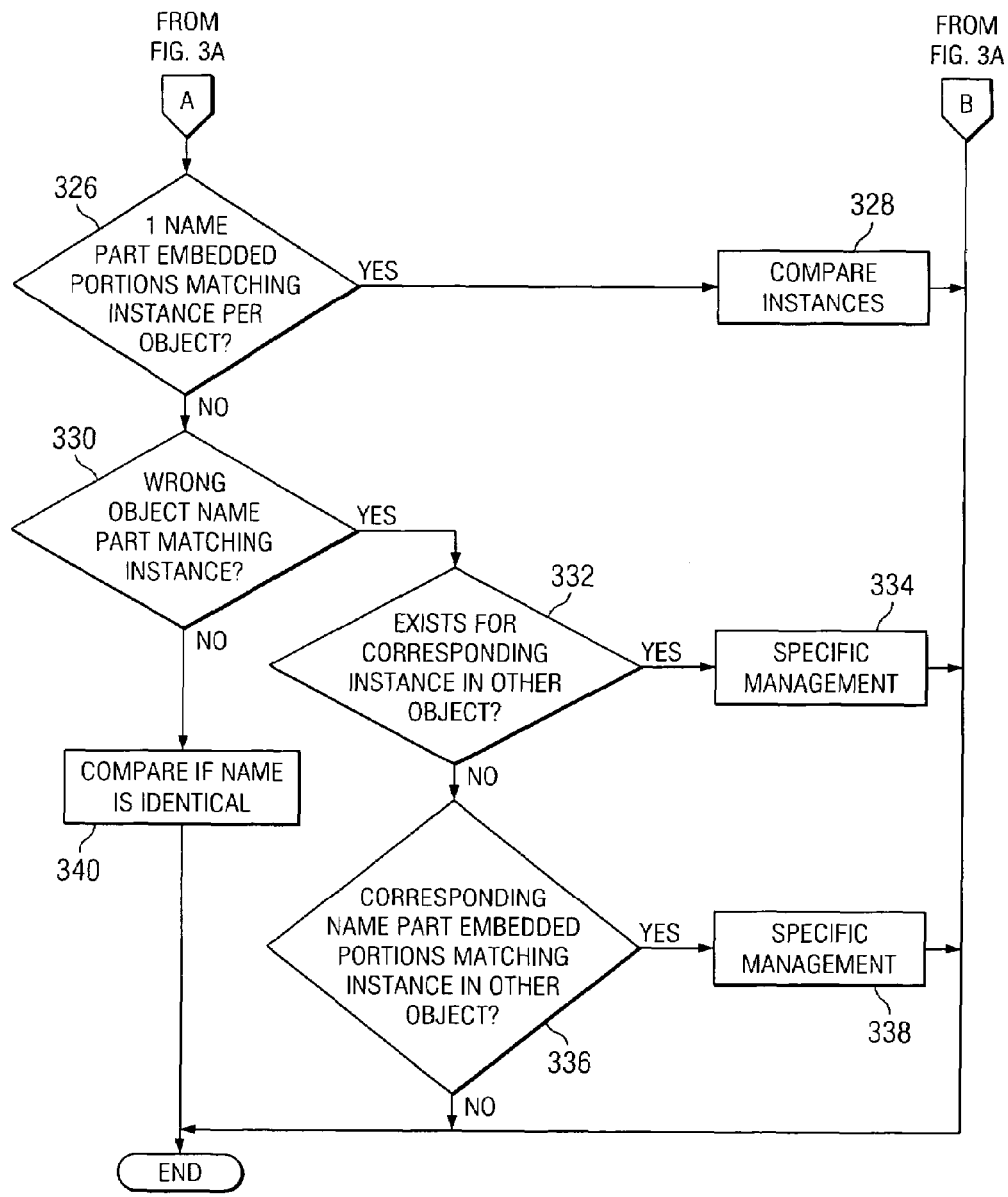

FIGS. 3A-B are flowcharts illustrating an example method 300 for selecting parameters 146 in a plurality of objects 145 to be compared. In general, method 300 discovers related parameters 146, based on the name portion of each parameter 146, between the plurality of objects 145 being compared. Based on these relations, comparison engine 130 selects at least a subset of parameters between each object 145 for comparison. For readability purposes, the following description of method 300 involves comparing two objects 145, a first object 145 and a second object 145. But it will be understood that any suitable number of objects 145 may be compared. Moreover, for ease of illustration, method 300 merely describes the selection of a first parameter 146 for comparison to a second parameter 146 in each respective object 145. But it will be understood that method 300 may be repeated as appropriate for each potential combination of parameters 146 in first and second objects 145. Further, as used in FIGS. 3A-B, a dependency or a match often comprises a dependency or a match that is identical, or comparable, per any suitable criteria, for each secondary parameter 146 that is a candidate for a comparison, the associated primary parameters 146 being themselves comparable. Method 300 is described in respect to system 100 and example comparison engine 130 of FIG. 1. However, any other suitable system or engine may use method 300 to select parameters 146 for comparison without departing from the scope of this disclosure.

Comparison engine 130 scans first and second objects 145 to determine the existence of parameters 146 that qualify as name portion potentially dependent parameters 146 at decisional step 302. If both objects 145 include only primary parameters or potentially dependent parameters 146 that don't include potentially dependent embedded portions in the name, then comparison engine 130 will automatically compare only parameters 146 with the same name between each object 145 at step 304. If comparison engine 130 locates name portion potentially dependent parameters 146 at step 302, then comparison engine 130 determines the aggregate number of instances of each name portion potentially dependent parameter 146. If comparison engine 130 determines that there is zero or one instances in each object 145 at decisional step 306, then execution proceeds to step 308 through 312. At decisional step 308, comparison engine 130 determines if there is one name part matching instance in each object 145. If there are, then the given instances in first object 145 and second object 145 are selected for comparison at step 310. Otherwise, if one of the instances is not a name part embedded portions matching instance or it doesn't exist in the other object, then the existing instances are be considered at step 312 as existing in one object 145 and not in the other object 145. Returning to decisional step 306, if there are more than one instance of parameter 146 in first object 145 and/or second object 145, then execution proceeds to step 314.

At decisional step 314, comparison engine 130 determines if, within one of the objects 145, multiple instances have identical names. If they have, comparison engine 130 determines at decisional step 316 if they have the same value. If they have the same value, then comparison engine 130 may process the instances based on the particular application 140 at step 318. There may be situations where, for example, first object 145 and second object 145 are compared and certain instances are to be reported as existing in one group and not in the other. Continuing this example, comparison engine 130 or another application may provide a warning and propose to remove the extraneous duplicate parameter in the given object, if the duplicate parameters 146 are determined to have minimal or no effect. If the values are different, then comparison engine 130 may process parameters 146 using different logic based on the particular application 140 at step 320. For example, there may be some application-specific criteria that determines which instance is relevant to the particular circumstance. In the next step, comparison engine 130 may then determine whether the order in which the instances appear is considered a relevant criteria for comparison.

If the order of the parameter instances has importance or is relevant at decisional step 322, then the first parameter instance in first object 145 should be compared with the first instance in second object 145 at step 324. Both the name and attribute portion from each parameter instance are selected for comparison and differences between either the name and value are often reported. Next, the second parameter instance in each object 145 should be compared, continuing until each instance in each object 145 are compared in a similar fashion. If the number of instances is different between the two objects 145, then the remaining one or more instances will be considered as existing in that object 145 and not in the other object 145.

If the order of the instances is determined to be relatively unimportant or not substantially relevant at decisional step 322, then processing proceeds to step 326. At decisional step 326, comparison engine 130 determines if there is one name part embedded portions matching instance in each object 145. If there is one name part embedded portions matching instance in each object 145, then comparison engine 130 selects the instance from each object 145 for comparison at step 328. Otherwise, processing proceeds to decisional step 330, where comparison engine 130 determines if one or more of the objects 145 include a wrong object name part matching instance. In certain embodiments, wrong object name part matching instance includes any instance of second parameter 146 in first object 145 that references a primary parameter 146 in second object 145 and not in first object 145 or vice versa. If either the first or second object 145 includes a wrong object name part matching instance, then processing proceeds to step 332.

At decisional step 332, comparison engine 130 determines if situation of 326 also occurs for the given parameter. In this case, first object 145 includes both an instance that matches an instance in second object 145 by ignoring the embedded portions and another instance that matches that same parameter instance of second object 145 with the name portion being substantially identical. Comparison engine 130 then processes these parameters 146 using logic based on the particular software application 140 at step 334. Otherwise, comparison engine 130 determines if the corresponding parameter exists in the second object with a name part being substantially identical, rather than ignoring embedded portions, as in the given wrong object name part matching instance of the first object. In this case, the name of the instance is the same in both objects 145, often without a difference in the potentially dependent embedded portion. Normally, the processing of these instances by comparison engine 130 is application-specific. Otherwise, if there is no corresponding name part embedded portions matching instance, then processing ends. Returning to decisional step 330, all other instances, in either object 145, are to be selected for comparison if the respective name portions are identical at step 340.

Figure 4:
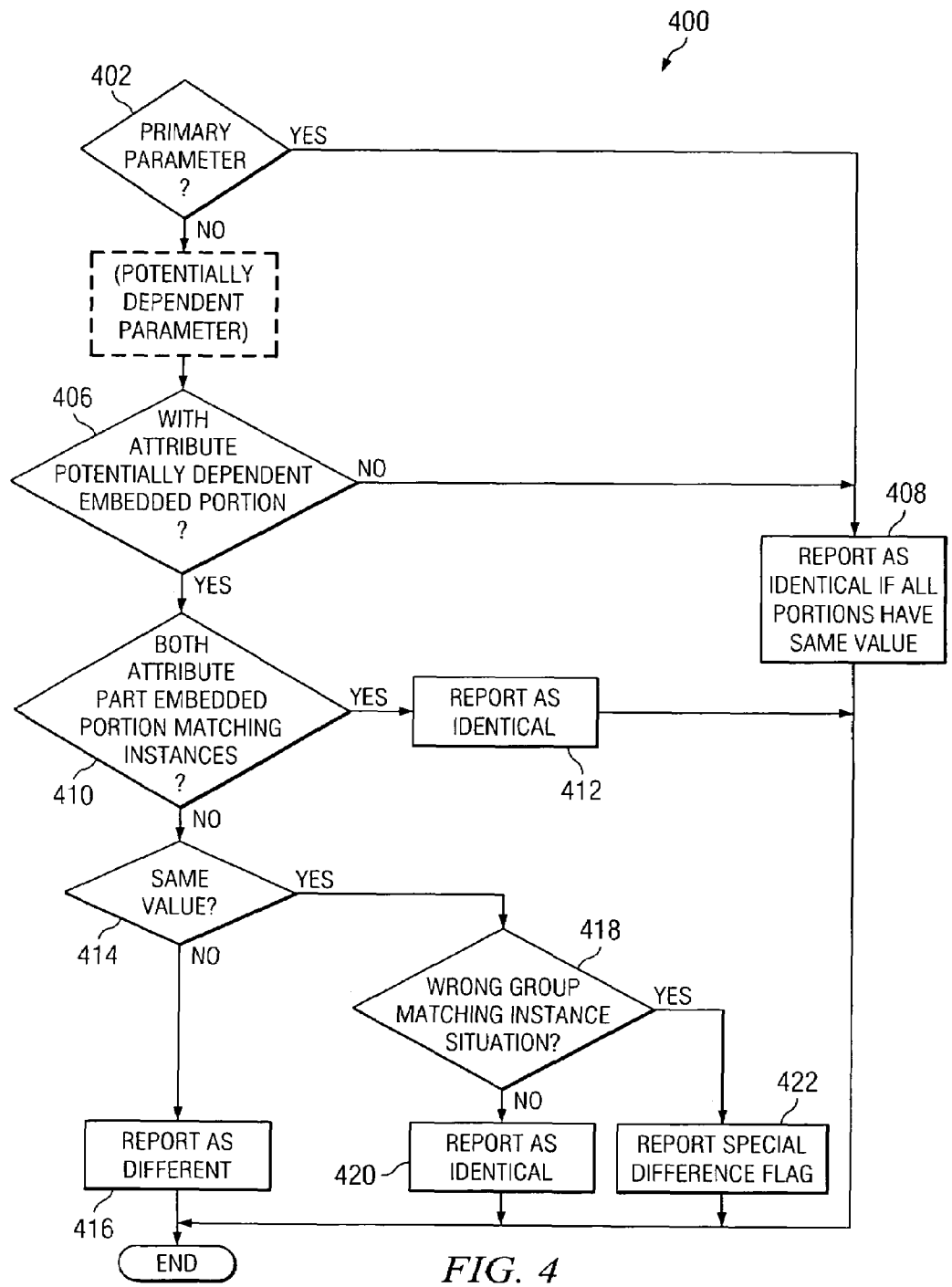
FIG. 4 is a flowchart illustrating an example method for reporting differences between selected portions of the objects according to one embodiment of the present disclosure.

FIG. 4 is a flowchart illustrating an example method 400 for reporting or ignoring differences between selected instances of parameters 146. Generally, method 400 identifies certain differences, between selected parameter instances, to be ignored. These parameter instances may be selected using any appropriate technique such as, for example, using method 300. As in FIGS. 3A-3B, the following description will focus on the operation of comparison engine 130 in performing method 400. But system 100 contemplates using any appropriate combination and arrangement of logical elements implementing some or all of the described functionality.

After any suitable selection of relationships between certain parameter instances in different objects 145 is at least partially completed, comparison engine 130 begins identifying and processing certain differences at step 402. At decisional step 402, comparison engine 130 determines if the relationship involves primary parameters 146. If so, then comparison engine 130 identifies the relationship as identical, or ignorable, if all the portions have the same value at step 408. Otherwise, comparison engine 130 reports the relationship as logically dissimilar due to differences in any portion of parameter 146. Returning to decisional step 402, if the "no" branch is taken, then comparison engine 130 processes parameters 146 as if each is potentially dependent parameter 146 with one or more potentially dependent embedded portions in the attribute portion. It will be understood that for simplification purposes, processing of non-primary parameters 146 that are not potentially dependent are generally not described in this figure because differences for such non-primary parameters 146 are typically reported like for a primary parameter 146.

Processing then proceeds to steps 406 through 422, where comparison engine 130 compares potentially dependent parameters 146. At decisional step 406, comparison engine 130 determines whether the two or more parameter instances include attribute potentially dependent embedded portions. If not, then comparison engine 130 identifies the relationship as identical, or logically similar, if all the portions have the same value at step 408. Otherwise, comparison engine 130 reports the relationship as logically dissimilar due to differences in any portion of parameter 146. But if the two or more parameter instances include attribute potentially dependent embedded portions, then comparison engine 130 determines whether the instances are attribute part embedded portions matching instances. If the instances are attribute part embedded portions matching instances, then comparison engine 130 identifies them as identical or ignorable at step 412. Otherwise, comparison engine 130 determines if the instances have the same value at decisional step 414.

If the instances do not have the same values, then comparison engine 130 identifies and reports the instances as logically dissimilar at step 416, where processing of this group of related parameters 146 ends. But, if the attributes are identical, then comparison engine 130 determines whether this is not a wrong group matching instance situation for the attributes part embedded portions at decisional step 418. If comparison engine 130 determines that the values are the same for the parameter instances, but one secondary parameter 146 references or includes one primary parameter 146 in another object 145, then comparison engine 130 may need to identify the instances as logically dissimilar and a special difference flag may be reported, depending on the application 140. Otherwise, comparison engine 130 reports the instances as identical at step 420 and this embodiment of method 400 ends.

Figure 5:
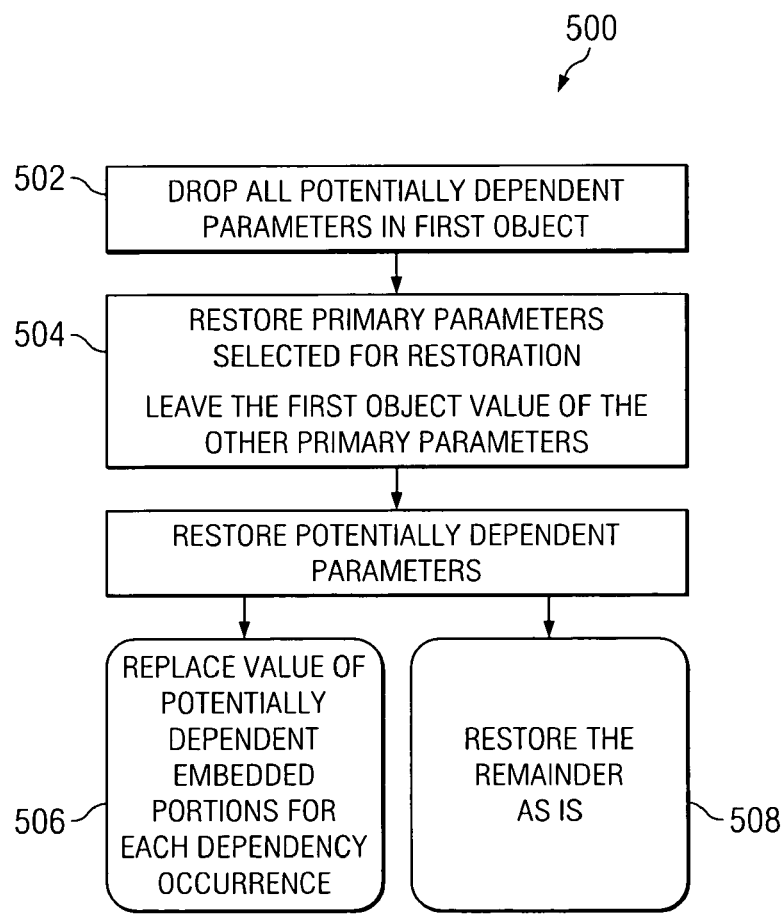
FIG. 5 is a flowchart illustrating an example method for restoring objects according to one embodiment of the present disclosure.

FIG. 5 is a flowchart illustrating an example method 500 for restoring objects 145 using a selected group of parameters 146. At a high level, method 500 involves restoring at least a portion of parameters 146 in a first object 145 based on primary and secondary parameters 146 in a second object 145. As in FIGS. 3A-3B, the following description will focus on the operation of comparison engine 130 in performing method 500. But system 100 contemplates using any appropriate combination and arrangement of logical elements, such as a restoration module, implementing some or all of the described functionality.

First, at step 502, comparison engine 130 removes the potentially dependent parameters 146 in first object 145. Next, at step 504, comparison engine 130 replaces certain primary parameters 146 in first object 145 with related primary parameters 146 in second object 145 as appropriate. The remaining primary parameters 146 in first object 145 are normally left with the original values. But, it will be understood that some or all of these remaining primary parameters 146 may be initialized to a default value or attribute without departing from the scope of this disclosure.

Once primary parameters 146 are restored, comparison engine 130 then restores the potentially dependent parameters 146 from second object 145 in steps 506 and 508. At step 506, for each "dependency occurrence" of one parameter 146 in second object 145, the value of the corresponding potentially dependent embedded portion is replaced with the value of the corresponding primary parameter 146 in first object 145. In many embodiments, this technique applies to dependency occurrences both in the parameter name and attributes. At step 508, comparison engine 130 restores the remainder of parameters 146 in first object 145 directly from second object 145.

The preceding flowcharts and accompanying descriptions illustrate exemplary methods of operation for selecting, comparing, and restoring objects 145 using various schemes and techniques. However, these methods are merely illustrative, and system 100 contemplates comparison engine 130 implementing any suitable techniques for selecting, comparing, and reporting on differences between objects 145 using some or all of the disclosed methods. Accordingly, any or all of these techniques may be used separately and/or together as appropriate to reduce the number of reported differences between objects 145 based on logical similarities. Moreover, because the flowcharts and descriptions are only illustrative, system 100 contemplates comparison engine 130 using methods with additional steps, fewer steps, and/or different steps, in any order so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A method for comparing objects comprising:
    selecting a first object and a second object, each object associated with an instance of at least one primary parameter and an instance of at least one secondary parameter, each secondary parameter associated with one of the primary parameters;
    comparing at least a portion of the first object and at least a portion of the second object to identify one or more differences between the selected objects;
    identifying at least a portion of the differences as ignorable based, at least in part, on the one or more primary parameters; and
    partially restoring the first object based on the second object using at least a portion of differences not identified as ignorable, wherein the restoring includes:
    selecting one or more primary parameters to be restored;
    selecting a secondary parameter instance from each object, the secondary parameter instance associated with one of the selected primary parameters;
    determining a non-dependent portion for each selected secondary parameter instance, the non-dependent portion comprising the value of the secondary parameter instance minus a value of the associated primary parameter instance; and
    replacing each selected secondary parameter instance from the first object with the primary parameter instance from the second object and the non-dependent portion from the selected secondary parameter instance from the first object.

2. The method of claim 1, each secondary parameter instance comprising an identifier and a value.

3. The method of claim 2, each difference selected from the group consisting of the following:
    secondary parameter identifier difference;
    secondary parameter value difference; and
    parameter group difference.

4. The method of claim 2, further comprising selecting a subset of the secondary parameters from each object for comparison based, at least in part, on one or more characteristics of each secondary parameter.

5. The method of claim 4, wherein comparing at least a portion of the first object and at least a portion of second object comprises comparing the selected subset of secondary parameter instances of the first object and the selected subset of secondary parameter instances of the second object.

6. The method of claim 5, wherein comparing the selected subset of secondary parameter instances of the first object and the selected subset of secondary parameter instances of the second object comprises:
    selecting one secondary parameter instance from each subset, each selected secondary parameter instance comprising a substantially similar name and a unique value;
    determining a non-potentially dependent portion for each selected secondary parameter instance, the non-potentially dependent portion comprising the value of the secondary parameter instance minus a value of the associated primary parameter instance; and
    in response to, at least in part, each non-potentially dependent portion being substantially identical, identifying the selected secondary parameter instance differences as ignorable.

7. The method of claim 1, the first and second object comprising a first and a second configuration of one software application.

8. The method of claim 1, one of the primary parameters comprising a system or environment variable.

9. The method of claim 1, each object comprising a database definition object.

10. The method of claim 1, each object comprising a configuration file including at least one path structure parameter.

11. Software for comparing objects, the software encoded in a computer readable media and operable when executed on a computer to:
    select a first object and a second object, each object associated with an instance of at least one primary parameter and an instance of at least one secondary parameter, each secondary parameter associated with one of the primary parameters;
    compare at least a portion of the first object and at least a portion of the second object to identify one or more differences between the selected objects;
    identify at least a portion of the differences as ignorable based, at least in part, on the one or more primary; and
    partially restore the first object based on the second object using at least a portion of differences not identified as ignorable, wherein the software instructions operable to partially restore the first object based on the second object include software instructions operable to:
    select one or more primary parameters to be restored;
    select a secondary parameter instance from each object, the secondary parameter instance associated with one of the selected primary parameters;
    determine a non-dependent portion for each selected secondary parameter instance, the non-dependent portion comprising the value of the secondary parameter instance minus a value of the associated primary parameter instance; and replace each selected secondary parameter instance from the first object with the primary parameter instance from the second object and the non-dependent portion from the selected secondary parameter instance from the first object.

12. The software of claim 11, each secondary parameter instance comprising an identifier and a value.

13. The software of claim 12, each difference selected from the group consisting of the following:
secondary parameter name difference;
secondary parameter value difference; and
parameter group difference.

14. The software of claim 12, further operable to select a subset of the secondary parameters from each object for comparison based, at least in part, on one or more characteristics of each secondary parameter.

15. The software of claim 14, wherein the software operable to compare at least a portion of the first object and at least a portion of the second object comprises software operable to compare the selected subset of secondary parameter instances of the first object and the selected subset of secondary parameter instances of the second object.

16. The software of claim 15, wherein the software operable to compare the selected subset of secondary parameter instances of the first object and the selected subset of secondary parameter instances of the second object comprises software operable to:
select one secondary parameter instance from each subset, each selected secondary parameter instance comprising a substantially similar name and a unique value;
determine a non-potentially dependent portion for each selected secondary parameter instance, the non-potentially dependent portion comprising the value of the secondary parameter instance minus a value of the associated primary parameter instance; and
in response to, at least in part, each non-potentially dependent portion being substantially identical, identify the selected secondary parameter instances as ignorable.

17. The software of claim 11, the first and second object comprising a first and a second configuration of one software application.

18. The software of claim 11, one of the primary parameters comprising a system or environment variable.

19. The software of claim 11, each object comprising a database definition object.

20. The software of claim 11, each object comprising a configuration file including at least one path structure parameter.

21. A system for comparing objects, comprises:
memory for storing a plurality of objects, each object associated with an instance of at least one primary parameter and an instance of at least one secondary parameter, each secondary parameter associated with one of the primary parameters; and
one or more processors collectively operable to:
select a first object and a second object from the plurality of objects;
compare at least a portion of the first object and at least a portion of the second object to identify one or more differences between the selected objects;
identify at least a portion of the differences as ignorable based, at least in part, on the one or more primary parameters; and
partially restore the first object based on the second object using at least a portion of differences not identified as ignorable, wherein the processors operable to partially restore the first object based on the second object include processors operable to:
select one or more primary parameters to be restored;
select a secondary parameter instance from each object, the secondary parameter instance associated with one of the selected primary parameters;
determine a non-dependent portion for each selected secondary parameter instance, the non-dependent portion comprising the value of the secondary parameter instance minus a value of the associated primary parameter instance; and
replace each selected secondary parameter instance from the first object with the primary parameter instance from the second object and the non-dependent portion from the selected secondary parameter instance from the first object.

22. The system of claim 21, each secondary parameter instance comprising an identifier and a value.

23. The system of claim 22, each difference selected from the group consisting of the following:
secondary parameter name difference;
secondary parameter value difference; and
parameter group difference.

24. The system of claim 22, the processors further operable to select a subset of the secondary parameters from each object for comparison based, at least in part, on one or more characteristics of each secondary parameter.

25. The system of claim 24, wherein the processors operable to compare at least a portion of the first object and at least a portion of the second object comprise processors operable to compare the selected subset of secondary parameter instances of the first object and the selected subset of secondary parameter instances of the second object.

26. The system of claim 25, wherein the processors operable to compare the selected subset of secondary parameter instances of the first object and the selected subset of secondary parameter instances of the second object comprise processors operable to:
select one secondary parameter instance from each subset, each selected secondary parameter instance comprising a substantially similar name and a unique value;
determine a non-potentially dependent portion for each selected secondary parameter instance, the non-potentially dependent portion comprising the value of the secondary parameter instance minus a value of the associated primary parameter instance; and
in response to, at least in part, each non-potentially dependent portion being substantially identical, identify the selected secondary parameter instances as ignorable.

27. The system of claim 21, the first and second object comprising a first and a second configuration of one software application.

28. The system of claim 21, one of the primary parameters comprising a system or environment variable.

29. The system of claim 21, each object comprising a database definition object.

30. The system of claim 21, each object comprising a configuration file including at least one path structure parameter.

31. A system for comparing objects comprising:
means for selecting a first object and a second object, each object associated with an instance of at least one primary parameter and an instance of at least one secondary parameter, each secondary parameter associated with one of the primary parameters;

means for comparing at least a portion of the first object and at least a portion of the second object to identify one or more differences between the selected objects;

means for identifying at least a portion of the differences as ignorable based, at least in part, on the one or more primary parameters; and means for partially restoring the first object based on the second object using at least a portion of differences not identified as ignorable, wherein the means for restoring includes:

means for selecting one or more primary parameters to be restored;

means for selecting a secondary parameter instance from each object, the secondary parameter instance associated with one of the selected primary parameters;

means for determining a non-dependent portion for each selected secondary parameter instance, the non-dependent portion comprising the value of the secondary parameter instance minus a value of the associated primary parameter instance; and means for replacing each selected secondary parameter instance from the first object with the primary parameter instance from the second object and the non-dependent portion from the selected secondary parameter instance from the first object.

* * * * *

UNITED STATES PATENT AND TRADEMARK OFFICE
CERTIFICATE OF CORRECTION

PATENT NO. : 7,353,510 B2
APPLICATION NO. : 10/733747
DATED : April 1, 2008
INVENTOR(S) : Noirot-Nerin Page 1 of 1

It is certified that error appears in the above-identified patent and that said Letters Patent is hereby corrected as shown below:

On the title page item (56), References Cited add the following:

| | | | |
|---|---|---|---|
| AA | 5,717,924 | 02/10/1998 | Kawai |
| AB | 6,026,408 | 02/15/2000 | Srinivasan et al. |
| AC | 6,105,062 | 08/15/2000 | Andrews et al. |
| AD | 6,345,311 | 02/05/2002 | Breslau et al. |

Signed and Sealed this

Nineteenth Day of August, 2008

JON W. DUDAS
*Director of the United States Patent and Trademark Office*